United States Patent [19]

Nakao et al.

[11] 4,292,285
[45] Sep. 29, 1981

[54] METHOD FOR REMOVING COMPOUNDS WITH OFFENSIVE ODOR FROM A GAS CONTAINING THE SAME

[75] Inventors: Masaaki Nakao, Kunitachi; Zenya Shiiki, Narashino, both of Japan

[73] Assignee: Taiyo Kaken Company, Ltd., Tokyo, Japan

[21] Appl. No.: 101,435

[22] Filed: Dec. 10, 1979

Related U.S. Application Data

[63] Continuation-in-part of Ser. No. 854,063, Nov. 22, 1977, abandoned.

[51] Int. Cl.³ ............................................. B01D 53/34
[52] U.S. Cl. ................................. 423/210; 423/230; 423/237; 423/245; 252/190; 252/193; 252/411 S; 252/420; 252/421; 252/444; 252/445; 422/4; 422/5

[58] Field of Search ............... 423/210 S, 245 S, 237, 423/230; 252/190, 193, 444–447, 411 S, 421, 420; 55/70, 68, 73; 422/4, 5

[56] References Cited

U.S. PATENT DOCUMENTS

| | | | |
|---|---|---|---|
| 1,319,663 | 10/1919 | Davis et al. | 423/237 X |
| 3,909,449 | 9/1975 | Nagai et al. | 252/444 X |
| 3,953,345 | 4/1976 | Saito et al. | 252/444 X |
| 4,045,368 | 8/1977 | Katori et al. | 252/445 X |
| 4,059,409 | 11/1977 | Barto et al. | 423/237 |

*Primary Examiner*—Earl C. Thomas
*Attorney, Agent, or Firm*—Wegner & Bretschneider

[57] ABSTRACT

A method for removing compounds with offensive odor from an exhaust gas containing the same with a deodorant comprising a mixture of spherical particles of activated carbon and spherical particles of porous carbon impregnated with phosphoric acid or ammonium phosphate placed in a fluidized-bed type deodorizing unit.

8 Claims, 2 Drawing Figures

METHOD FOR REMOVING COMPOUNDS WITH OFFENSIVE ODOR FROM A GAS CONTAINING THE SAME

CROSS-REFERENCE TO RELATED APPLICATION

The present application is a continuation-in-part of application Ser. No. 854,063, filed Nov. 22, 1977, now abandoned.

FIELD OF THE INVENTION

The present invention relates to a method for removing compounds with offensive odor from a gas containing the same.

BACKGROUND OF THE INVENTION

In recent years, the regulation on environmental pollution due to offensive odor has come to be strict and accordingly several apparatus and deodorants for deodorizing gases having disagreeable odor and for releasing the deodorized gases into atmosphere have been developed. The representative one of such apparatus is the deodorizing apparatus which directly burns the gas or the apparatus which catalytically burns the gas, however, in the operation of these apparatus it is necessary to raise the temperature of the gas to be treated to about 300°–1,000° C.

Consequently, an enormous expense of fuel is necessitated for warming a large amount of flowing gas containing compounds with offensive odor at a low concentration, resulting in economic disadvantages.

A conventional activated carbon is unsuitable for the purpose of removing the compounds with offensive odor such as ammonia and amines by adsorbing them. Because such a conventional activated carbon does not absorb such a compound contained in a gas at an extremely small concentration. As for the deodorants for removing the basic compounds, sulfonated coal (Japanese Patent Publication No. 38-18356 (18356/1963), etc.) and ion exchange resins, etc. have been proposed.

However, they are unsuitable for use in a fluidized-bed type apparatus because of their insufficient mechanical strength and the possibility of their decomposition due to irreversible chemical changes when they are heated at a temperature of 100° to 300° C. in their regeneration step. Conventional adsorbents and deodorants are quite unsatisfactory for removing ammonia and amines from a large amount of a flowing exhaust gas containing the same at a low concentration by the use of a fluidized-type deodorizing unit, because of their poor heat-stability or adsorbency.

SUMMARY OF THE INVENTION

Therefore, the object of the present invention is to provide a method for removing the compounds having offensive odor from gases containing the same, without accompanying the defects of the prior art described above.

As a result of studies for providing deodorants having properties superior to those of conventional deodorants, we have found that a mixture of specific spherical particles of activated carbon and specific spherical particles of porous carbon impregnated with phosphoric acid or ammonium phosphate is highly suitable as the deodorant for the above-mentioned purpose. The present invention has been achieved on the basis of this finding.

BRIEF DESCRIPTION OF THE DRAWINGS

In the accompanying drawings

DETAILED DESCRIPTION OF THE INVENTION

Figure 1:
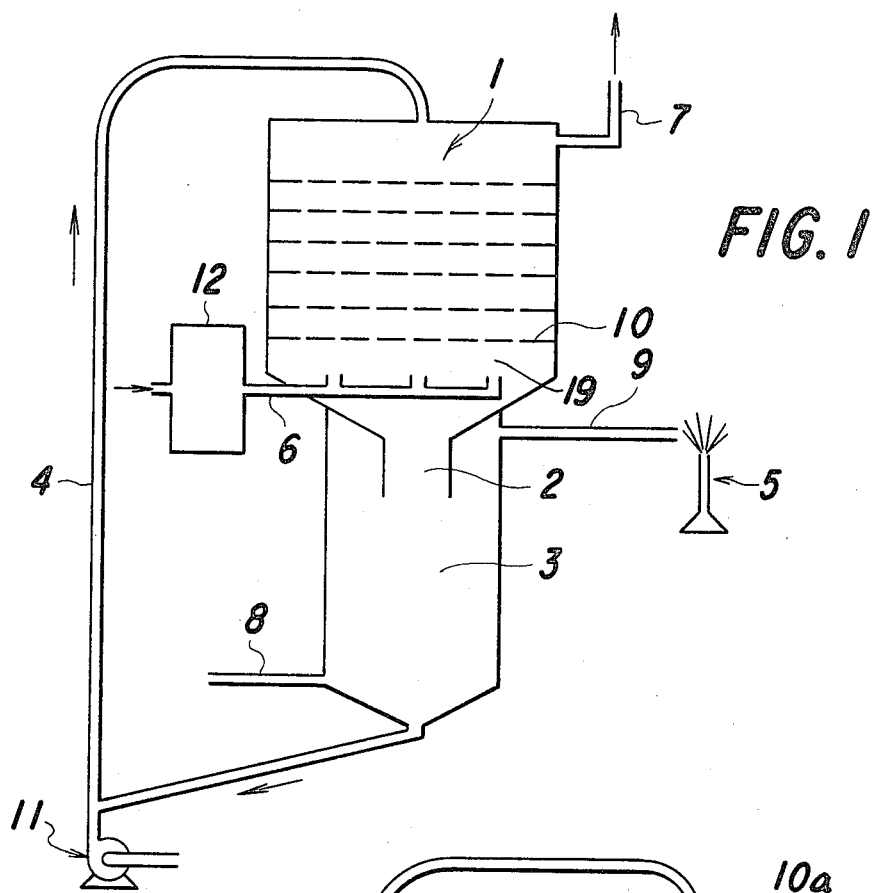
FIG. 1 is a diagram showing one example of the procedures in the case where the compounds with offensive odor are removed from a gas containing the same according to the present invention, utilizing a fluidized-bed type continuous gas adsorbing apparatus.

Both the spherical particles of porous carbon and the spherical particles of activated carbon can be manufactured from pitch as a starting material as has been disclosed in, for instance, Japanese Patent Publication Nos. 49-25117 (25117/1974) and 50-18879 (18879/1975).

The spherical particles of activated carbon have a value of pH 8 to 10, a high hardness and strength of the surface, a compression strength of 500–1,500 g/cm$^2$.

The diameter of the spherical particles is not less than 0.2 mm, preferably in the range of 0.2–2.0 mm. In order to impregnate the spherical particles of activated carbon with phosphoric acid or ammonium phosphate onto a predetermined amount of phosphoric acid or ammonium phosphate is dissolved into a water and then a predetermined amount of the particles is immersed into the solution, and after being kept still, water is distilled off from the mixture. The dried particles are heated at a suitable temperature.

It is necessary that phosphoric acid or ammonium phosphate is attached onto the particles in an amount of 1–50%, preferably 10–25%, by weight based on the weight of the particle. That is, in the case where the amount is less than 1% by weight it is difficult to catch the basic compounds in the gas to be deodorized effectively. While in the case where the attached amount is larger than 50% by weight, phosphoric acid or ammonium phosphate corrodes metals of the apparatus.

According to the present invention, a gas containing compounds with offensive odor (such as ammonia, alkylamines such as methylamine and ethylamine, pyridine methyl mercaptan, hydrogen sulfide, acetaldehyde, styrene, phenol or mixtures of more than two kinds of these compounds) is brought into contact with the deodorant obtained as is described above. The temperature in the contacting zone is not higher than 100° C. and preferably not higher than 50° C. An apparatus of the fluidized-bed type is advantageously utilized.

The mechanism of deodorization and regeneration in the case of ammonia gas is considered to follow the following equation:

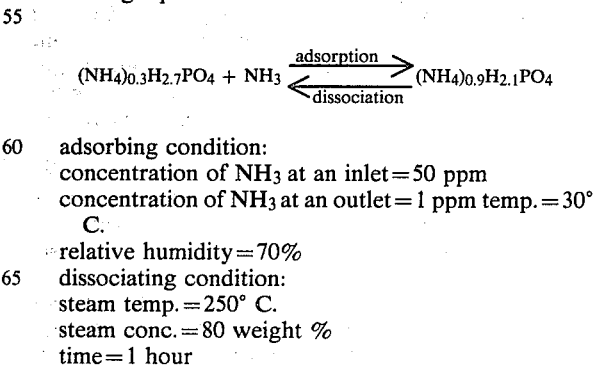

adsorbing condition:
concentration of NH$_3$ at an inlet = 50 ppm
concentration of NH$_3$ at an outlet = 1 ppm temp. = 30° C.
relative humidity = 70%
dissociating condition:
steam temp. = 250° C.
steam conc. = 80 weight %
time = 1 hour The mechanism of deodorization in other compound has not been elucidated.

It is presumed that the other compounds with offensive odor are caught and bound by van der Waals' absorption, capillary condensation and/or acid-base affinity. And the mechanism of the regeneration of the deodorant has not been elucidated.

In cases where the amount of basic compounds is larger than other compounds with offensive odor also contained in the gas, the ratio of the spherical particles of activated carbon to the porous spherical carbon particles is 0–5, preferably 0.1–1.

Such a gas may be brought into contact with a mixture of the spherical particles of activated carbon and the spherical porous carbon particles as described above, with a result of simultaneous removal of the basic compounds and the other compounds with offensive odor.

In addition, the deodorant of the present invention can be regenerated by heating with a superheated steam having a concentration of 50–100%. The highest temperature of regeneration is lower than 500° C., preferably lower than 300° C. and the lowest temperature of regeneration is higher than 100° C., preferably higher than 150° C.

When the once used deodorant is thus regenerated, the absorbed compounds are released from the carbon particles and may be burnt in an after-burner or on platinum catalyst, if necessary, after condensation as a liquid.

As is seen in FIG. 1, the continuous gas adsorbing apparatus is made of stainless-steel (SUS 316, Japanese Standard) and comprises three sections, the one being the controlling humidity section 12, the two being adsorbing section 1 for taking hold of compounds with offensive odors in the upper position, and the other being the regenerating section 3 for the used deodorant in the lower position and the two sections being connected by a thin conduit 2. The regenerated deodorant is transferred through a thin air-lift pipe 4 from the bottom of the regenerating section 3 to the top of the adsorbing section 1. The adsorbing section 1 is a cylinder of 150 mm in inner diameter and is provided with six perforated plates 10 which are arranged in horizontal position with mutual vertical distance of 100 mm, the perforated plate being a stainless steel of 2 mm in thickness and having number of circular holes of a diameter of 3.5 mm so as to correspond to 17 percent of aperture ratio. The bottom of the adsorbing section 1 forms an inverse cone and is connected to the conduit 2, which is a cylinder of 30 mm in inner diameter and acts as a conduit to transfer the deodorant downwards and as a seal preventing the upward escape of condensed gas with offensive odor. The regenerating section 3 is also a cylinder of 100 mm in inner diameter, its top being connected to the conduit 2 and its bottom forming an inverse cone connected to the air-lift pipe 4. The heat source, a mixture of superheated steam and gaseous nitrogen at a high temperature, is directly introduced into the regenerating section 3 via the inlet pipe 8. The air-lift pipe 4 is 10 mm in inner diameter and the transfer of the regenerated deodorant via the pipe 4 is carried out by compressed air supplied from the air compressor 11.

The introduced gas is controlled in humidity before the adsorbing section 1, and the controlled gas has the relative humidity of 40 to 90%, preferably 50 to 80%.

The controlled gas is then introduced into the absorbing section 1 through inlet pipe 6.

The controlled and introduced gas with offensive odor is deodorized while passing through the fluidized bed of deodorants on 6 perforated plates 10 and then exhausted from the outlet pipe 7 at the top of the section 1. On the other hand, the deodorant flows downwards at first from the uppermost perforated plate while being brought into countercurrent contact with the upgoing flow of the gas to be treated on each of the perforated plates, and after reaching onto the bottom section 19 of the section 1 the deodorant flows down to the regenerating section 3 via the duct 2. The regenerating section 3 is completely packed with the deodorant particles taking a form of fluidized-bed and the deodorant in the section 3 flows down with a controlled residence time of about 80 min within the section 3. The deodorizer which adsorbed the compounds with offensive odor in the adsorbing section 1 is heated to a temperature of about 100° to 500° C. by superheated stream containing a small amount of nitrogen at a ratio of 0 to 1 and the deodorant is regenerated during its flow-down as a fluidized-bed in the regenerating section 3. The regenerated deodorant is transferred to the top of the adsorbing section 1 again via the air-lift pipe 4 in order to adsorb the compounds having offensive odor. The condensed gas with offensive odor released in the section 3 is exhausted through the outlet pipe 9 at the upper section of the section 3 and the gas is burned by the Bunsen burner 5, then exhausted as an odorless gas. The thickness of the fluidized-bed on each of the perforated plates 10 in the adsorbing section 1 is maintained at about 10–20 mm.

Figure 2:
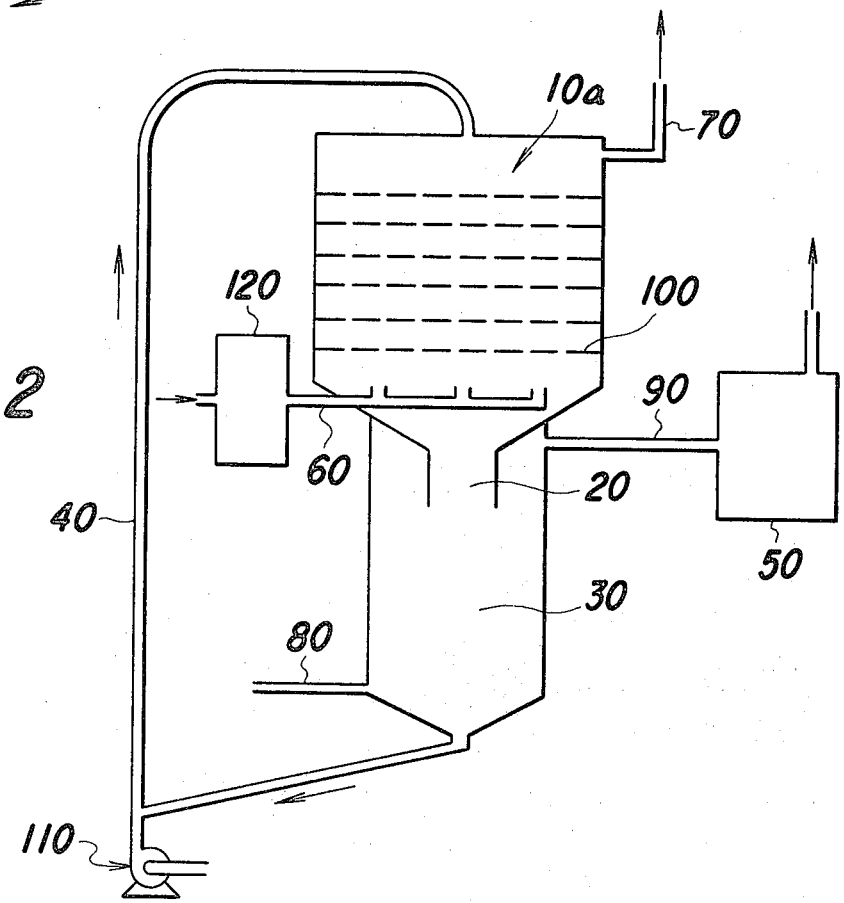
FIG. 2 is a diagram showing other example of the procedures.

As is seen FIG. 2, the continuous gas adsorbing apparatus is similar to the apparatus in FIG. 1, but the released gas from the particles, for instance is condensed and then burned on a catalyst 50. The reference numerals employed on FIG. 2 correspond to those used on FIG. 1 with the addition of a zero, with the exception that reference No. 10a in FIG. 2 corresponds to reference No. 1 on FIG. 1 and reference No. 50 on FIG. 2 refers to a catalyst, instead of Bunsen burner 5 on FIG. 1. The names and functions of the apparatus elements on FIG. 2 are otherwise the same as on FIG. 1.

As is described above, the deodorant used in the present invention is easily regenerated, the repeated use of the deodorant being possible, and as will be clearly understood by Examples hereinafter, gases containing compounds with offensive odor are extremely effectively treated with the deodorant of the present invention. Therefore, the basic compounds contained even at a very low concentration in a large amount of flowing gas can be effectively removed and so the present invention is especially suitable for treating gases with offensive odor such as those exhausted from shell-mold factories, systems or equipments treating drains, filths and dusts. In addition, according to the present invention, ammonia in the exhaust gas after the process of removal of $NO_x$ by reduction of $NO_x$ with ammonia are also effectively recovered.

The following Examples more concretely explain the present invention, but the present invention should not be limited by these Examples.

EXAMPLE 1

(A) Preparation of spherical particles of activated carbon.

Six kilograms of pitch (softening point of 200° C., carbon content of 94% by weight, ratio of H/C of 0.59 and nitrobenzene-insoluble component of 36% by weight) obtained by thermal cracking of Seria crude oil at 2,000° C. and 1.6 kg of technical grade naphthalene were charged into a 20 l-autoclave provided a paddle-type stirrer and after the gaseous phase within the autoclave was exchanged by nitrogen, the content was melt-mixed at 150° C. under agitation, and after adding 11 kg of a 0.22% by weight aqueous solution of a suspension-agent of incompletely hydrolyzed polyvinyl acetate type (GOSENOL product of Nippon Gosei Co., Ltd.) the mixture was agitated at 260 rpm at 150° C. for 30 min to make a dispersion of droplets, then cooling the whole material to a temperature of 30° C. for obtaining solidified particles of mixture of pitch and naphthalene, of average diameter of about 1 mm. The particles were extracted with n-hexane for 5 hours to remove naphthalene from the particles and to obtain porous particles of pitch. The pitch particles were then oxidized by heating in air from 100° C. to 300° C. at a rate of temperature raising of 10° C./h to obtain infusible pitch particles. The infusible pitch particles were activated with steam at 800° C. for 10 hours, with an yield of about 40%. The particles of activated carbon thus obtained had a value of pH of 8 to 10, were nearly spherical, and showed a compression strength of 500–1,500 g/cm$^2$ and a high hardness of the surface and were not easily pulverized. By sifting these particles, the fraction of 0.7–1.1 mm in diameter was collected to be used in the following experiments.

(B) Preparation of particles porous carbon impregnated with phosphoric acid.

A mixture of 100 g of the spherical particles of activated carbon prepared in step (A) and 200 ml of an aqueous 25% by weight phosphoric acid solution was placed in a 500 ml-beaker. The mixture was heated and boiled for 10 minutes. After cooling, the particles were filtrated from the aqueous solution and the separated particles were dried up at a temperature of 120° C. for a night. One hundred grams of the dried particles were impregnated with 15 g of phosphoric acid.

EXAMPLE 2

Removal of compounds with offensive odor from a gas containing the same.

As a model of gases containing compounds having offensive odor, a gaseous mixture was prepared by mixing 80 ppm of ammonia and 10 ppm of dimethylamine as the basic compounds, and 10 ppm of formaldehyde and 30 ppm of benzene as the other compounds with air, the temperature of the gaseous mixture was adjusted to 30° C., and the humidity of the gaseous mixture was controlled at 70% R.H.

A fluidized-bed type continuous gas adsorbing apparatus shown in FIG. 1 was used for experimental treatment of the gas containing the compounds, and a Bunsen burner was used for the treatment of a condensed gas released in the cases of regeneration of the used deodorant.

The gas to be treated was introduced into the adsorbing section 1 from the inlet pipe 6 at the lower position of the section 1 at a linear velocity of 90 cm/sec to fluidize the deodorant particles on the perforated plates 10.

After operating the apparatus for 60 hours of recycled adsorption and regeneration, the treated gas was sampled at the exhaust pipe 7 at the top of the adsorbing section 1, and the content of remaining components with offensive odor was determined. The results of determination are shown in the following Table 1.

The comparative operation using a sulfonated coal as a deodorant was obliged to be stopped after a continuous run of only 12 hours owing to the severe pulverization of the particles of sulfonated coal and the rapid reduction of its adsorbing activity due to an irreversible change by regeneration at high temperature.

TABLE 1

Residual concentration of compounds with offensive odor in the gas treated by deodorants (at 60 hours of continuous operation) The weight ratio of particles of porous carbon to particles of activated carbon was indicated respectively.

| Agents impregnated (%) | | The weight ratio (porous/activated) | Ammonia (ppm) | Dimethylamine (ppm) | Formaldehyde (ppm) | Benzene (ppm) | Remarks |
|---|---|---|---|---|---|---|---|
| phosphoric acid | 4 | 1/0 | 2 | 1 | 1 | <2 | |
| phosphoric acid | 8 | 1/0 | <1 | <1 | 2 | <7 | |
| phosphoric acid | 16 | 1/0 | <0.5 | <1 | 2 | <10 | |
| phosphoric acid | 32 | 1/0 | <0.1 | <1 | 3 | <14 | |
| ammonium tertiary phosphate | 12 | 1/0 | <1 | <1 | 2 | <7 | |
| diammonium tertiary phosphate | 5 | 1/0 | 5 | 1 | 2 | <6 | |
| phosphoric acid | 16 | 1/0.5 | <0.5 | <1 | 2 | <1 | |
| phosphoric acid | 16 | 1/1 | <1 | <1 | <2 | <1 | |
| Comparable experiments with deodorants other than the present invention | | | | | | | |
| the particles of activated carbon from a pitch | | 0/1 | 76 | 9 | <1 | <1 | |
| coconut-shell coal impregnated 12% of ammonium tertiary phosphate | | | | | | | |
| a sifted fraction of 0.7–1.1 mm of crushed commercial origin | | — | 2 | <1 | 6 | 16 | considerable pulverization of the deodorant occirred |
| sulfonated coal | | — | — | — | — | — | operation was stopped due to |

TABLE 1-continued

Residual concentration of compounds with offensive odor in the gas treated by deodorants (at 60 hours of continuous operation)
The weight ratio of particles of porous carbon to particles of activated carbon was indicated respectively.

| Agents impregnated (%) | The weight ratio (porous/activated) | Ammonia (ppm) | Dimethylamine (ppm) | Formaldehyde (ppm) | Benzene (ppm) | Remarks |
| --- | --- | --- | --- | --- | --- | --- |
| phosphoric acid *R.H. = 30% | 16 | 1/0 | 5 | 3 | 2 | 10 | pulverization and deterioration of the deodorant |

*on this case, the humidity of the gaseous mixture was 30% R.H.

EXAMPLE 3

Deodorant A was a mixture of the particles of activated carbon prepared by Example 1 (A) and the particles of porous carbon impregnated with 8% by weight of phosphoric acid prepared by Example 1 (B), and the weight ratio of the particles of activated carbon to the particles porous carbon is one.

Deodorant B was prepared by impregnating 8% by weight of phosphoric acid into spherical particles of activated carbon, which are prepared by mixing 90% by weight of commercial powdered carbon, each 5% by weight of pitch and phenol resin as binders, granulating the mixture and activating the granules by heating in an atmosphere of nitrogen at a temperature of 900° C. for 5 hours, having an average.

The apparatus used for the present experiment was the same as that used in Example 2, containing 3 kg of the deodorant.

The model gas containing basic components with offensive odor was an air containing 20 ppm of ammonia, which was introduced at a temperature of 30° C. and humidity of 70% R.H. in the apparatus at a linear velocity of 90 cm/sec.

Each run of the experiment was continuously carried out for 90 days while daily determining the concentration of ammonia in the air at the inlet and at the outlet of the apparatus and the amount of dust caught by a dust catcher installed in the exhaust pipe 7 of the apparatus.

Experimental Run No. 1 was carried out by using Deodorant A, while Experimental Run No. 2 was carried out by using Deodorant B.

The results are shown in Table 2 below.

TABLE 2

| Run No. 1 | | | | |
| --- | --- | --- | --- | --- |
| Days of operation | 3 | 30 | 60 | 90 |
| Concentration of NH$_3$ (inlet) | 20 | 19 | 20 | 20 |
| Concentration of NH$_3$ (outlet) | 0.2 | 0.4 | 0.8 | 1.0 |
| Rate of removal of NH$_3$ (%) | 99 | 98 | 96 | 95 |
| Amount of dust (g) | 1.5 | 15 | 27 | 36 |
| Run No. 2 (comparative) | | | | |
| Days of operation | 3 | 30 | 60 | 90 |
| Concentration of NH$_3$ (inlet) | 20 | 20 | 19 | — |
| Concentration of NH$_3$ (outlet) | 0.4 | 2.6 | 6.65 | — |
| Rate of removal of NH$_3$ (%) | 98 | 87 | 65 | — |
| Amount of dust (g) | 27 | 240 | 450 | — |

As is seen in Table, while Deodorant A according to this invention was able to catch the ammonia in the flow gas at a rate of removal of more than 95% for about 3 months, the performance of the Deodorant B was very poor, its ability to remove the ammonia rapidly decreasing as time passed and the run had to be stopped by severe clogging of the flow of gas due to the accumulation of dust of carbon powders from the collapsed particles of the spherical activated carbon in the duct 7.

What is claimed is:

1. In the method of removing basic compounds and other compounds with offensive odor from a large amount of a flowing exhaust gas containing the same at a low concentration by bringing said gas into contact with particles of activated carbon, the improvement comprising:

using a mixture of (1) particles of activated carbon having a value of compression strength of 500 to 1,500 g/cm$^2$ and (2) particles of porous carbon impregnated with an amount of 1–50% by weight of phosphoric acid or ammonium phosphate or mixtures thereof, said particles of activated carbon being prepared by (a) mixing a pitch of softening point of 50° to 350° C., of a carbon content of 80 to 97%, of a ratio of hydrogen to carbon of 0.3 to 2.5 and of a nitrobenzene-insoluble fraction of less than 60% by weight with at least one aromatic hydrocarbon, (b) forming the mixture into substantially spherical particulate shape, (c) immersing the thus formed spherical particles into a solvent in which said pitch is hardly soluble but said aromatic hydrocarbon is easily soluble thereby extracting said aromatic hydrocarbon from said spherical particles of pitch, (d) oxidizing the extracted particles at a temperature of from room temperature to 400° C. with an oxidant thereby forming infusible pitch particles, (e) carbonizing the pitch particles thus made infusible in an inert atmosphere at a temperature higher than 600° C., and (f) activating said carbonized particles with steam;

controlling the humidity of said exhaust gas;

bringing said controlled exhaust gas into countercurrent contact in a fluidized bed with said mixture of particles of activated carbon and particles of porous carbon impregnated with phosphoric acid or ammonium phosphate or mixtures thereof at a temperature of lower than 100° C. thereby removing from said exhaust gas said compounds with offensive odor;

heating said mixture after said countercurrent contact with said exhaust gas together with steam thereby expelling said compounds with offensive odor as condensed gaseous matter from said mixture and also regenerating the adsorbing capability of said mixture of particles; and recycling the thus regenerated mixture into said step of countercurrent contact.

2. The method according to claim 1, wherein said mixture comprises one part by weight of said spherical particles of porous carbon impregnated with phosphoric acid and/or ammonium phosphate, 0 to 5 parts by weight of said spherical particles of activated carbon.

3. The method according to claim 2, wherein said mixture comprises one part by weight of said spherical particles of activated carbon and one to two parts by weight of said particles of porous carbon impregnated with phosphoric acid and/or ammonium phosphate.

4. The method according to claim 1, wherein said spherical particles of activated carbon are of 0.2 to 2.0 mm in diameter.

5. The method according to claim 1, wherein said steam used for regenerating step is a superheated steam at a temperature of 100° to 500° C.

6. The method according to claim 5, wherein said superheated steam is at a temperature of 150° to 300° C.

7. The method according to claim 1, wherein said controlled exhaust gas has a value of humidity of 40 to 90% R.H.

8. The method according to claim 1, wherein said particles of porous carbon are impregnated with 10–25% by weight of phosphoric acid.

* * * * *